United States Patent
Buttini et al.

(10) Patent No.: US 9,801,393 B2
(45) Date of Patent: Oct. 31, 2017

(54) PROCESS FOR THE PRODUCTION OF A SHELF-STABLE FILLED SPONGE-TYPE BAKERY PRODUCT

(71) Applicant: BARILLA G. E R. FRATELLI S.P.A., Parma (IT)

(72) Inventors: Roberto Buttini, Parma (IT); Corrado Ferrari, Parma (IT); Alessio D'Urso, Parma (IT)

(73) Assignee: BARILLA G. E R. FRATELLI S.P.A., Parma (IT)

( * ) Notice: Subject to any disclaimer, the term of this patent is extended or adjusted under 35 U.S.C. 154(b) by 0 days.

(21) Appl. No.: 15/310,018

(22) PCT Filed: Mar. 30, 2015

(86) PCT No.: PCT/EP2015/056842
§ 371 (c)(1),
(2) Date: Nov. 9, 2016

(87) PCT Pub. No.: WO2015/172935
PCT Pub. Date: Nov. 19, 2015

(65) Prior Publication Data
US 2017/0188594 A1    Jul. 6, 2017

(30) Foreign Application Priority Data
May 15, 2014  (EP) ..................... 14425058

(51) Int. Cl.
| A21D 13/08 | (2006.01) |
| A21D 13/066 | (2017.01) |
| A21D 2/18 | (2006.01) |
| A21D 8/06 | (2006.01) |
| A21D 13/11 | (2017.01) |
| A21D 13/32 | (2017.01) |
| A21D 13/14 | (2017.01) |

(52) U.S. Cl.
CPC ........... *A21D 13/066* (2013.01); *A21D 2/186* (2013.01); *A21D 8/06* (2013.01); *A21D 13/11* (2017.01); *A21D 13/14* (2017.01); *A21D 13/32* (2017.01)

(58) Field of Classification Search
CPC .......... A21D 13/32; A21D 13/14; A21D 8/06
See application file for complete search history.

(56) References Cited

U.S. PATENT DOCUMENTS

2007/0207240 A1 * 9/2007 Hansen ................. A21D 2/186
426/94

FOREIGN PATENT DOCUMENTS

| FR | 469570 A | 8/1914 |
| JP | H01265851 A | 10/1989 |

OTHER PUBLICATIONS

Database WPI, 1989, Thomson Scientific, XP002730465. "Sponge cake dough is injected in the moulding frame having bottom comprising heat proof paper, synthetic resin almifoil and metal plate. It is steamed, then further dough is put in so that pre-baked sponge cake is covered by it. Filling is put in the centre of the dough, and it is steamed again.", p. 1.
Swanson, "Madeleines Recipe", 101 Cookbooks, 2007, pp. 1-9, XP055143441, Retrieved from the Internet: URL:http://www.101cookbooks.com/archives/madeleines-recipe.html.
Database GNPD,"Peach Custard Sponge Cake", Mintel, 2014, pp. 1-3 Database accession No. 2321210.
International Search Report for International Application No. PCT/EP2015/056842 (dated Jul. 23, 2015) (4 Pages).
International Preliminary Report on Patentability For International Application No. PCT/EP2015/056842 (dated Jul. 27, 2016) (17 Pages).

* cited by examiner

*Primary Examiner* — Kelly Bekker
(74) *Attorney, Agent, or Firm* — Lucas & Mercanti, LLP (57) ABSTRACT

A process for the production of a shelf-stable bakery product comprising a) preparation of a first batter containing sugar, flour, oils and/or fats etc.; b) emulsification and dosing of the first batter on a baking surface; c) steaming the first batter to form a layer of semi-baked mixture; d) dosing of a filling inside the layer of semi-baked mixture of step c), placed in a baking mold and thus obtaining an open filled semi-finished product; e) preparation of a second batter containing sugar, flour, fats and/or oils etc.; f) emulsification and dosing of the second batter on the open and filled semi-finished product of step d), thus obtaining a covered and filled semi-finished product; g) steam baking the product obtained in step f) to form a baked and filled bakery product; h) cooling; and i) packaging.

21 Claims, 2 Drawing Sheets

PROCESS FOR THE PRODUCTION OF A SHELF-STABLE FILLED SPONGE-TYPE BAKERY PRODUCT

CROSS-REFERENCE TO RELATED APPLICATIONS

This application is a 371 of PCT/EP2015/056842, filed Mar. 30, 2015, which claims the benefit of European Patent Application No. 14425058.6, filed May 15, 2014.

FIELD OF APPLICATION

The present invention relates to the technical area of the food industry and relates, in particular, to a process for the production of a packaged shelf-stable filled sponge-type bakery product.

PRIOR ART

Packaged sweet sponge-type bakery products of the snack type with filling are known in the art. Usually these are made up of a baked mixture (or cake) of the sponge cake or brioche type associated with a hydrated filling cream for example vanilla- or cocoa-based, or a jam.

This type of product has been very widespread commercially for years and is therefore available in a large variety of forms. It is, in fact, a practical and tasty solution for a snack between meals. In some cases it is a product of cylindrical shape in which sponge cake coated with a filling is rolled up on itself. In other cases the filling is placed between two layers of sponge cake (like a sandwich). In still other cases the filling is located only inside the cake and is not visible from the outside.

The production process of this latter type of product usually comprises the injection of a filling in a semi-finished product made of a traditionally baked mixture.

Alternatively, the process consists of placing part of a mixture, for example for sponge cake, in a mould, placing the filling at the centre of the mould on top of the raw mixture and finally covering it all with additional sponge cake mixture. The preparation is then baked in a traditional oven for the time necessary for its baking.

This solution, although more complex, can be preferable industrially, compared to the injection of the filling in a baked semi-finished product, since it allows to obtain a finished product of higher quality.

The bakery product with an injected filling in fact inevitably has a more or less evident hole on a surface, which, in addition to being aesthetically unappealing, can cause a possible leakage of the filling from the cake during processing and/or storage of the product. Moreover this type of product does not allow the injection of large quantities of filling and is subject to a certain unpredictability, and therefore variability, in terms of the distribution of the filling inside the product.

On the contrary, in the case of products in which the filling is placed during a processing step between two dosings of mixture, it is possible to obtain a reliable reproducibility of the characteristics of the finished product.

However, also this latter type of product has drawbacks.

With the process just described, in fact, it is not possible to include in the snack a high content of filling because the latter would tend, because of its considerable weight, to sink and seep into the thickness of the mixture underneath, with the risk of leakage from the base of the mixture while it is still raw.

This process has a further drawback given by the fact that the presence of a hydrated filling inside a snack mixture, following baking of the snack, leads to the formation, in the finished product, of concavities at the interface between cake and filling, and therefore a discontinuity of structure inside the product. The two components of the snack, the cake and the filling, in fact, have different behaviours during the step of baking of the snack, and in particular, whereas the mixture increases in volume, the filling instead does not vary its volume. The result is therefore empty areas at the interface between the filling and the cake.

The baking in a traditional oven of the aforesaid product inevitably causes, moreover, the formation of a crust and/or cracks on the surface of the product and at the same time gives rise to the migration of the humidity coming from a hydrated filling through the mixture, a phenomenon which continues also during the time of storage of the finished product. The result is thus a humidity gradient that crosses the thickness of the cake from the inside, which is moister, towards the outside of the finished snack, which is drier. Part of the filling consequently dehydrates, decreasing in volume in the formation of the aforementioned humidity gradient, leaving the finished product with less filling.

This, in addition to being aesthetically unappealing due to the cracks that form in the cake and possible darker colouring at the drier areas, is also a disadvantage from the organoleptic point of view. In this case, in fact, the snack may be too dry or even crispy outside.

In order to overcome the above disadvantages, instead, it is desirable from an industrial point of view to obtain a product in which the casing (cake, i.e. baked mixture) is soft, without a crust, and with humidity content which is homogeneous, just like, consequently, its appearance, and in which the content of filling is the highest possible.

The need therefore arises to make available a packaged shelf-stable bakery product of the type which has a casing of cake and a filling, wherein the casing exhibits a sponge-type texture and a uniform appearance free from cracks and crust and uniform in colour, and wherein the baked bakery product exhibits at the same time a high content of filling.

Patent application WO 2009/021553 (Puratos N. V.) describes a method for the production of a steamed cake doughnut-which has a total fats content comprised between 7 and 18%, which comprises the fact of making available a batter made of a powder mixture comprising wheat flour (30-50 wt %), a chemical leavening agent, sugar (22-32 wt %), egg yolk (3-10 wt %), emulsifiers, fats (8-16%) and optionally enzymes, milk proteins, salt, starch, hydrocolloids, dextrose and/or cocoa powder. The cake is steam baked at the temperature of about 100° C. for about 4-6 minutes. The presence of a hydrated filling is also foreseen, such as for example a cream, in the case of cakes without a hole, injected into the cake.

JP 2007 306850 describes a western version of "dorayaki", which comprises two layers of baked mixture, made of wheat flour, sugar, eggs, oils and fats, and a filling placed between the two layers. The baking is performed at a temperature of 200-300° C. for 20-30 seconds.

FR 469 570 A discloses a filled "madeleine" and the process for the production thereof. This process comprises the formation of a base by pouring a batter for "madeleine" into a mold and subjecting it to a partial baking, sufficient to impart a relatively solid consistency to the base, so that a filling, e.g. jam, can be deposited thereon. Then additional batter is added to fill the mold, which is introduced into a conventional oven until complete baking.

JP H01265851 discloses the preparation of a steamed sponge cake, whereby a dough is injected into a mould, pre-baked with steam, then a second dough is added to cover the pre-baked sponge cake, a filling is put in the center of the dough and it is steamed again.

The technical problem of the present invention is therefore to make available a packaged shelf-stable bakery product of the type which has a casing of cake and a filling, wherein the casing has a sponge-type texture and a uniform appearance, free from cracks, crust, and uniform in colour, and wherein in the baked bakery product the content of filling is as high as possible.

A further technical problem of the present invention is to make available an aforesaid bakery product that contains no artificial preservatives.

SUMMARY OF THE INVENTION

The technical problem stated above was therefore solved by making available a process for the production of a packaged shelf-stable sponge-type bakery product having a casing of chemically leavened cake and a filling inside the casing, which comprises the steps of:
a) preparation of a first mixture batter comprising sugar, flour, animal and/or vegetable fats and/or oils, at least one leavening agent, starch, egg products and optionally water and at least one organoleptically characterising ingredient;
b) emulsification and dosing of the first batter on a baking surface;
c) pre-steam baking of the first batter with the formation of a layer of semi-baked mixture;
d) dosing of a filling inside the layer of semi-baked mixture of step c), placed in a baking mould which gives to the layer of semi-baked mixture a concave shape, thus obtaining an open and filled semi-finished product;
e) preparation of a second mixture batter comprising sugar, flour, animal and/or vegetable fats and/or oils, at least one leavening agent, starch, egg products and optionally water and at least one organoleptically characterising ingredient;
f) emulsification and dosing of the second batter obtained in step e) on the open and filled semi-finished product of the above-mentioned step d), thus obtaining a covered and filled semi-finished product;
g) steam baking of the covered semi-finished product obtained in step f) with the formation of a baked and filled bakery product that comprises a casing of cake and an inner filling;
h) cooling of the baked and filled bakery product thus obtained; and
i) packaging of the baked and filled bakery product.

The expression "cake casing" refers here, in the baked product, to the cake (i.e. baked mixture), corresponding to the first and to the second batter, inside of which a filling is placed so that the latter is not visible from the outside of the casing itself.

The term "filling" refers here to a hydrated or anhydrous filling.

In particular, the expression "hydrated filling" means here that the water content of the filling is at least 5% based on the total weight of the filling, preferably at least about 15%.

The expression "anhydrous filling" means here that the water content of the filling is less than 5% based on the total weight of the filling.

The expression "shelf-stable" refers to a shelf life of at least 3 months, preferably at least 6 months at room temperature.

With the term "concave" in reference to the mixture in step d), it is meant that, with the placing in the mould, the mixture takes on a shape such that it is able to hold in a concavity the filling which is dosed inside.

The expression "organoleptically characterising ingredient" means here an ingredient characterising the taste and the appearance of the finished bakery product.

The term "covered and filled semi-finished product" means here that the second batter covers the entire exposed surface made up of the first batter and by the filling inside it, so that the filling is no longer visible.

Preferably, the chemically leavened cake of the invention is selected from any chemically leavened sponge-type cake, more preferably selected from sponge cake, shortcrust pastry, short dough, cake of the type for torta margherita, for muffins, for brownies and for plum cake, or other cakes of similar textures, even more preferably sponge cake.

Preferably, in step a) the first batter comprises, by weight based on the total weight of the mixture, 23-28% sugar, 10-15% flour, 8-13% animal and/or vegetable fats and/or oils, about 0.3-0.8% of at least one leavening agent, 10-15% starch, 20-30% egg products, and optionally 0-5% water and 0-8% of at least one organoleptically characterising ingredient.

In step a) of preparation of a first batter, the organoleptically characterising ingredient is preferably selected from cocoa, chocolate, milk, coffee, nuts, cereal grain particles, malt, fruit and vegetable juices and purees, or mixtures thereof, more preferably cocoa powder.

The expression "cereal grain particles" refers to any solid form of a cereal grain other than its flour, for example flakes, grains (or kernels) or fractions thereof, raw or processed, for example expanded, extruded or roasted.

Preferably, the organoleptically characterising ingredient is present at 2-6%, more preferably at about 6% by weight based on the total weight of the batter.

Preferably, the animal and/or vegetable fats and/or oils are selected from butter, palm fat, canola oil, sunflower oil, or a mixture thereof, preferably butter and palm fat.

Preferably, the starch is selected from starch of wheat, rice, potato, corn, tapioca, optionally deglutinated, or mixtures thereof, preferably wheat starch.

Preferably, the flour is selected from any cereal flour, wholemeal or refined, with or without gluten, more preferably from the group comprising durum wheat, soft wheat, *turanicum* wheat (*Triticum turgidum* ssp. *turanicum*), rye, corn, rice, spelt, barley, sorghum, millet, oats, triticale, buckwheat, *quinoa*, and mixtures thereof, even more preferably soft wheat flour.

Preferably, the weight ratio between the contents of starch and of flour is between 0.5 and 3, more preferably about 1.2.

Preferably, the egg products can be selected from yolk, egg white, whole eggs, or a combination thereof, each one independently in the form of a liquid, spray, or powder, more preferably whole liquid eggs, liquid egg yolk and egg white powder.

Preferably, the weight ratio of the contents of liquid whole egg, liquid yolk and egg white powder is 14:11:1.

Preferably, the leavening agent is selected from sodium bicarbonate, acid sodium pyrophosphate, carbonate, ammonium bicarbonate or mixtures thereof.

Preferably, the first batter of step a) further comprises emulsifying agents in a quantity comprised between 0.5 and 2% by weight based on the total weight of the batter, preferably mono/diglycerides of fatty acids.

Preferably, in said step a), the batter further comprises salt, more preferably in a quantity comprised between 0.1 and 0.3% by weight based on the total weight of the batter, more preferably 0.2.

Preferably, in said step a) of preparation of the first batter, the ingredients are mixed in the following order: sugar is added to a mixture of the aforesaid animal and/or vegetable fats and/or oils, optionally already in a mixture with the at least one organoleptically characterising ingredient, preferably with mixing; after mixing the liquids are added, for example the liquid egg products and the water, and finally the powders (including the leavening agents and powdered egg products) and any remaining ingredients.

Preferably, at the end of step a) of mixing, the mixture has a temperature comprised between 15 and 30° C., preferably 20° C.

Preferably, the step a) of mixing is carried out for a duration of time comprised between 5 and 15 minutes, more preferably 12 minutes, until complete mixing.

Preferably, the preparation of the first batter of step a) is performed in a planetary mixer fitted with a wire whisk.

Preferably in step b) of emulsification and dosing of the first batter, the emulsification is carried out by passing the batter in a turboemulsifier, thus obtaining for example a batter that has a flow rate measured by the Bostwick method for 30 seconds of 0 cm/30".

Preferably, the turboemulsifier is operated at a number of revolutions of the rotor per minute comprised between 100 and 200, more preferably 150, with incorporation of a percentage of air by volume based on the volume of the mixture comprised between 20 and 40%, more preferably between 26 and 30%, even more preferably 28%.

Preferably, the dosing of step b) is carried out by means of a rotary stencil machine, for example by Reisdorf (Germany).

Preferably, in step b) of emulsification and dosing of the first batter, the baking surface is substantially flat, more preferably a grid covered with a sheet of baking paper. In a preferred embodiment, the baking paper preferably has a weight of 70-90 g/m$^2$, more preferably 80 g/m$^2$.

Preferably, the step c) of pre-baking of the first batter is performed in a steam oven with homogeneous atmosphere of saturated steam at ambient pressure.

Preferably, the step c) of pre-baking is performed at a temperature comprised between 90 and 100° C. for a time comprised between 3 and 7 minutes, more preferably at a temperature of 98° C. for 5 minutes.

Preferably, at the end of step c) of pre-baking of the first batter, the layer of semi-baked mixture has a humidity comprised between 20 and 30, more preferably equal to about 27.

Advantageously, the mixture obtained in step b), relatively low in water, increases in humidity content during baking thanks to the saturated steam in the oven. Unlike baking in a traditional oven, this type of baking gives in fact the baked mixture a considerable softness and homogeneity in the distribution of the humidity. Baking in a steam oven also prevents the formation of a crust on the surface.

Preferably, the filling of step d) is hydrated and is selected from the group which comprises a cream, preferably cocoa-flavoured, jam, honey, fruit puree, or combinations thereof, more preferably a cocoa flavoured cream.

Preferably, in step d), the baking mould is of semispherical shape.

Preferably, in step d) of dosing of a filling, the filling is dosed up to the substantial filling of the layer of semi-baked mixture.

Preferably, the filling is a cocoa-flavoured cream and comprises by weight based on the total weight of the filling 20-24% glucose syrup, 20-24% water, 6-10% vegetable and/or animal fats and/or oils, 10-20% chocolate, 3-6% starch, more preferably corn starch, 4-10% sugar, 3-7% cocoa powder, 7-13% powdered milk and 3-9% dextrose, 0.1-0.6% mono- and diglyceride emulsifiers.

Preferably, the quantity of filling that is dosed on the layer of semi-baked mixture is such as to constitute at least 40% by weight based on the weight of the finished baked bakery product, more preferably at least 50%, even more preferably 60 to 70%.

Preferably, in step d) of dosing of the filling, the temperature of the filling is about 25-35° C., more preferably 30° C.

Preferably, the filling is brought to the above-mentioned temperature by means of a scraped surface heat exchanger.

Preferably, in step d) of dosing, the hydrated filling has a flow rate measured by the Bostwick method for 30 seconds comprised between 3 and 12 cm/30", more preferably 8 cm/30".

This rate in fact makes it possible to obtain an optimal flatness of the hydrated filling once dosed in the first semi-baked mixture.

Preferably, in step e) the first batter comprises, by weight based on the total weight of the mixture, 23-28% sugar, 10-15% flour, 8-13% animal and/or vegetable fats and/or oils, about 0.3-0.8% of at least one leavening agent, 10-15% starch, 20-30% egg products and optionally 0-5% water and 0-8% of at least one organoleptically characterising ingredient.

In step e) of preparation of a second batter, the organoleptically characterising ingredient is preferably selected from cocoa, chocolate, milk, coffee, nuts, cereal grain particles, malt, fruit and vegetable juices and purees, or mixtures thereof, more preferably cocoa powder.

Preferably, in step e), the organoleptically characterising ingredient is present at 2-6%, more preferably about 6% by weight based on the total weight of the batter.

Preferably, in step e), the animal and/or vegetable fats and/or oils are chosen from butter, palm fat, canola oil, sunflower oil, or a mixture thereof, preferably butter and palm fat.

Preferably, in step e), the starch is selected from starch of wheat, rice, potato, corn, tapioca, optionally deglutinated, or mixtures thereof, preferably wheat starch.

Preferably, in step e), the flour is selected from any cereal flour, wholemeal or refined, with or without gluten, more preferably from the group comprising durum wheat, soft wheat, *turanicum* wheat (*Triticum turgidum* ssp. *Turanicum*), rye, corn, rice, spelt, barley, sorghum, millet, oats, triticale, buckwheat, *quinoa*, and mixtures thereof, even more preferably soft wheat flour.

Preferably, the weight ratio between the contents of starch and flour is comprised between 0.5 and 3, more preferably about 1.2.

Preferably, the egg products can be selected from yolk, egg white, whole eggs, or a combination thereof, each one independently in the form of a liquid, spray, or powder, more preferably whole liquid eggs, liquid egg yolk and egg white powder.

Preferably, the weight ratio of the contents of liquid whole egg, liquid yolk and egg white powder is 14:11:1.

Preferably, the leavening agent is selected from sodium bicarbonate, acid sodium pyrophosphate, carbonate, ammonium bicarbonate or mixtures thereof.

Preferably, the second batter of step e) further comprises emulsifiers in an amount comprised between 0.5 and 2% by weight based on the total weight of the batter, preferably mono/diglycerides of fatty acids.

Preferably, in said step e), the batter further comprises salt, more preferably in a quantity comprised between 0.1 and 0.3% by weight based on the total weight of the batter, more preferably 0.2.

Preferably, in said step e) of preparation of the second batter, the ingredients are mixed in the following order: sugar is added to a mixture of the aforesaid animal and/or vegetable fats and/or oils, optionally already in a mixture with the at least one organoleptically characterising ingredient, preferably with mixing; after mixing the liquids are added, for example the liquid egg products and the water, and finally the powders (including the leavening agents and powdered egg products) and any remaining ingredients.

Preferably, at the end of step e) of mixing, the mixture has a temperature comprised between 15 and 30° C., preferably 20° C.

Preferably, the step e) of mixing is performed for a duration of time comprised between 5 and 15 minutes, more preferably 12 minutes, until complete mixing.

Preferably, the preparation of the second batter of step e) is carried out in a planetary mixer fitted with a wire whisk.

Preferably in step f) of emulsification and dosing of the second batter, the emulsification is carried out by passing the batter in a turboemulsifier, thus obtaining for example a batter that has a flow rate measured by the Bostwick method for 30 seconds of 0 cm/30".

Preferably, the turboemulsifier is operated at a number of revolutions of the rotor per minute comprised between 150 and 250, more preferably 200, with incorporation of a percentage of air by volume based on the volume of the mixture between 25 and 50%, more preferably between 35 and 40%, even more preferably 38%.

Preferably, in step f), the dosing of the second batter is carried out by means of a dispenser with rotary nozzle.

Preferably, in step f), the dosing of the second batter forms on the open and filled semi-finished product a substantially flat surface that covers it completely.

Preferably, the first batter of step a), the second batter of step e) and the filling of step d) are free from gluten, wherein said starch is deglutinated, preferably rice and corn, and said flour is gluten free, preferably rice flour.

Preferably, the first batter of step a), the second batter of step e) and the filling of step d) do not contain artificial preservatives.

Preferably, the step g) of baking of the second batter is performed in a steam oven with homogeneous atmosphere of saturated steam at ambient pressure.

Preferably, the step g) of baking of the second batter is performed at a temperature comprised between 90 and 100° C. for a time comprised between 8 and 16 minutes, more preferably at a temperature of 98° C. for 12 minutes.

Preferably, at the end of baking, the casing of cake has a humidity comprised between 20 and 30%, more preferably equal to about 28%.

As explained above, in fact, the second mixture obtained in step f) is also hydrated during baking thanks to baking in a saturated steam oven.

Preferably, at the end of the baking of step g), the casing of cake, formed from the first and from the second layer of mixture, has substantially homogeneous organoleptic, appearance and humidity and water activity characteristics.

Preferably, the step h) of cooling is performed immediately after the exit from the oven and has a duration of 5-15 minutes, preferably about 7 minutes.

The baked bakery product exiting from step g) of baking of the second mixture is removed from the mould preferably by means of a suction pad system.

Preferably, the step h) of cooling is followed by a step of surface decoration of the baked product, more preferably carried out with dosing of an anhydrous filling according to techniques known in the field, followed optionally by a further cooling of 5-10 minutes.

Preferably, step i) of packaging is performed in a filtered air chamber.

In step i) the product is preferably packaged in a metallized barrier film.

Preferably, in the finished product, the casing has homogeneous organoleptic and rheological properties over the whole product.

For this purpose, the aforesaid layer of semi-baked mixture of step b), upon dosing, can be formed with different rheological properties compared to the second layer of mixture at dosing (step f)). In particular, the specific weight can be different between the two mixtures. This can be achieved with a different treatment in the steps of emulsification and dosing respectively b) of the first batter and f) of the second batter, which contemplates in the case of the first batter an increase in volume that is lower than that contemplated for the second batter. Preferably, the first batter has a higher specific weight compared to the second batter.

The above-mentioned different features of the first and second batter are such as to compensate the different baking treatments to which the two batters have to be subjected. Following the step g) of baking of the semi-finished product, the second batter is in fact subjected to a first and only baking, whereas the first semi-baked batter is subjected to a second and final baking. Thanks to said technique during the emulsification step, the baked and filled bakery product advantageously does not exhibit dishomogeneity in texture between the casing part that corresponds to the first batter and the casing part that corresponds to the second batter.

Both of the above-mentioned parts are thus characterised by a sponge-type and soft texture, such as the sponge cake type, and a substantially homogeneous and uniform appearance, free of crust or cracks.

It is also to be noted that the fact of forming the closure of the open filled semi-finished product with a second layer of raw mixture, rather than pre-baked and cut, gives rise to a product which, after baking, exhibits a casing having a substantially one-piece structure, no point of joining being evident between the parts that correspond to the first and second layer of mixture. This is an advantage not only in terms of appearance but also in terms of quality of the finished product, since the baked and filled bakery product is not susceptible to leakage of the filling.

With respect to the prior art in which the closure of the product is achieved by a layer of second pre-baked and cut mixture, the method of the present invention represents moreover the advantage of allowing the step of baking of the second mixture to be carried out in line with the overall production process, that is to say without the need to perform it in parallel. This translates into a more streamlined and therefore faster process with respect to the prior art. It also represents an advantage from the economic point of view because it allows to avoid wastage caused by the fact of having to cut out a pre-baked mixture, and because it allows the baking of the second mixture to be carried out in a single baking step.

The process of the present invention allows the preparation of the product to be carried out in only two steps of baking, and at the same time to obtain, at the end of the second step of baking, an optimal baking of both layers.

A method also falls within the scope of the present invention which consists in carrying out steps a) to i) described above, optionally with the inclusion of a step of surface decoration as described above between steps h) and i).

As seen before, step d) of the process of the present invention envisages the dosing of a filling inside the layer of semi-baked mixture of step c), placed in a baking mould which gives to the layer of semi-baked mixture a concave shape. This allows to include in the final bakery product a mugh higher quantity of filling than with the processes of the prior art, such as e.g. the process according to FR 469 570 A, which involves the deposition of a filling, such as jam, onto a substantially flat pastry base.

The present invention also refers to the product obtained by means of the process of the present invention.

Advantageously, the finished product has a shelf life of at least 3 months, more preferably 6 months.

Preferably, the fats content of the finished product is comprised between 8 and 16%, more preferably between 10 and 16%, even more preferably between 12 and 16%, most preferably it is 14% by weight based on the weight of the finished product.

Preferably, in the finished product, the casing has a water activity value between 0.85 and 0.90, more preferably comprised between 0.86 and 0.89, even more preferably about 0.87; and the hydrated filling has a value of water activity comprised between 0.84 and 0.90, more preferably comprised between about 0.86 and 0.88, even more preferably about 0.87.

Preferably, the cake casing of the baked bakery product of the present invention has a value of humidity comprised between 20 and 30, more preferably about 28.

Preferably, the bakery product according to the invention does not contain artificial preservatives.

Preferably, the bakery product according to the invention is gluten free.

Advantageously, the bakery product of the present invention is free of crust.

Steam baking allows in fact to obtain a cake characterised by the absence of a crust. The saturated steam, in fact, does not dry the surface of the mixture, unlike what would happen in a conventional oven, but on the contrary, as already explained above, it increases the humidity of the baked mixture with respect to the raw mixture.

Moreover, preferably, the casing of the finished product has as a whole, namely both on the exposed surface and in its interior, a homogeneous colouring.

It should be noted, moreover, that the average values of water activity and of humidity of the bakery product of the present invention are relatively low compared to similar products of the prior art, and such as to effectively contribute to the inhibition of bacterial proliferation and organoleptic deterioration for a long period of time.

Moreover, thanks to the particular process of the invention, a considerable balancing is obtained of the humidity and of the water activity of the mixture and hydrated filling that lead to a reduced migration of water or even to an absence of such migration during storage, and therefore a prolonged duration in time of the optimal organoleptic characteristics of the product.

For these reasons, the bakery product of the present invention does not require the presence of added artificial preservatives. The term "artificial preservatives" refers here in particular to food additives identified by codes from E200 to E299 defined by law at European level (Directive of the European Parliament and of the European Council 2003/114/EC of 22 Dec. 2003).

Preferably, therefore, the bakery product of the present invention contains no added artificial preservatives. This represents an advantage with respect to the prior art because it results in a product that is perceived by the consumer as being healthier and more natural and genuine. In a preferred embodiment, the bakery product has a flat and circular base, with diameter of about 7-8 cm, and a height of approximately 2.5-3.5 cm at the point in which the height is greatest.

In this embodiment, in fact, the first mixture of semi-spherical shape will constitute the upper surface of the final bakery product, while the second mixture will constitute the aforementioned flat and circular base.

DETAILED DESCRIPTION

The present invention will be described further by referring to the exemplary embodiments given here below by way of a non-limiting illustration.

Example 1

A first liquid mixture (first batter) was prepared having the composition described in Table 1.

TABLE 1

Composition of the first batter

| Ingredients | Quantity expressed in percentage by weight based on the weight of the mixture |
|---|---|
| Cocoa powder | 5.6 |
| Caster sugar | 25.8 |
| Concentrated butter | 4 |
| Fractionated palm fat | 4.6 |
| Monoglycerides in paste | 5.1 |
| De-shelled whole eggs | 13.8 |
| Liquid egg yolk | 11 |
| Water | 2.2 |
| Wheat starch | 13.9 |
| Sodium bicarbonate | 0.20 |
| Ammonium carbonate | 0.10 |
| Acid sodium pyrophosphate | 0.30 |
| Soft wheat flour | 11.7 |
| Spray egg white | 1 |
| Flavouring | 0.50 |
| Salt | 0.20 |

The batter was prepared, at room temperature, in a planetary mixer fitted with a wire whisk.

In a first step 1, cocoa and sugar were mixed, dry, at 20 rpm for one minute, to avoid the formation of lumps in the later steps. Then, in a step 2, butter, palm fat and mono- and diglycerides of fatty acids were added, with mixing at 20 rpm for one minute followed by mixing at 50 rpm for 3 minutes. In a step 3, the eggs, the egg yolk and water were added, mixing at 20 rpm for one minute and then at 30 rpm for 2 minutes. Finally, in a step 4, the powders (i.e. the remaining ingredients of Table 1) were added with mixing at 40 rpm for 2 minutes and then at 20 rpm for 2 minutes.

The humidity content of the mixture thus formed was 27%.

The mixture thus obtained was transferred to a turboemulsifier where it was subjected to a treatment with the following parameters (Table 2) to homogenize the mixture.

TABLE 2

Parameters of homogenisation of the first batter

| | |
|---|---|
| Rotor turns | 150 rpm |
| % Air | 28 |
| Counter-pressure | 2 bars |
| Specific weight at entry | 0.95-1.05 g/ml |
| Specific weight at exit | 0.68-0.72 g/ml |
| Mixture flow rate upon exit | 0 cm/min (Bostwick 30") |
| Mixture temperature upon exit | 26-30° C. |

The mixture thus processed was then made to proceed to the dosing system which comprises a rotary stencil machine.

The dispenser deposited a round disk of mixture having weight of 7.5 g on a sheet of baking paper with weight of 80 g/m² and this enters a first steam baking oven. The oven has a homogeneous atmosphere of saturated steam at ambient pressure and the temperature inside the chamber is 98° C. The baking process had a duration of about 5 minutes.

The baked disk thus obtained was detached from the baking paper and inserted in a metal mould with imprint of semispherical shape. The mould was Teflon-coated in order to obtain a good extraction of the product without the use of release agents.

19 g of a hydrated cream having the composition of Table 3 was then dosed inside the mould containing the disk of baked mixture, having previously been brought to the temperature of 30° C. by means of a scraped surface heat exchanger. The flow rate of the cream was 8 cm/30" measured by the Bostwick method.

TABLE 3

Composition of the cream

| Ingredients | Quantity expressed in percentage by weight based on the weight of the mixture |
|---|---|
| Glucose syrup | 21.8 |
| Water | 22.8 |
| Refined palm fat (melted at 60° C.) | 7.1 |
| Mono- and diglycerides of fatty acids | 0.5 |
| Dark chocolate | 15.5 |
| Corn starch | 4 |
| Caster sugar | 7.4 |
| 20/22 cocoa powder | 4.1 |
| Skimmed milk powder | 10 |
| Dextrose | 6.8 |

A second mixture was prepared as per the first batter described above, with the difference that the parameters of homogenisation are as per Table 4.

TABLE 4

Parameters of homogenisation of the second batter

| | |
|---|---|
| Rotor turns | 200 rpm |
| % Air | 38 |
| Counter-pressure | 1.8 bars |
| Specific weight at entry | 0.95-1.05 g/ml |
| Specific weight at exit | 0.62-0.66 g/ml |
| Mixture flow rate upon exit | 0 cm/min (Bostwick 30") |
| Mixture temperature upon exit | 31-33° C. |

Finally 8.5 g of the second batter was dosed by means of a rotary nozzle on the semi-finished product thus obtained, to cover the surface of the product and thus close the semi-finished product obtained, forming a flat surface.

The baking moulds were then placed in the steam oven and baked for a time of 12 minutes with average temperature of 98° C.

The baked product was removed from the mould immediately after the exit from the oven with suction pad system and left to cool in an air-conditioned environment at 20° C. for approximately 15 minutes.

At the end of the cooling phase the surface decoration of the product was carried out with a milk-based anhydrous cream by means of a jet printer.

The bakery product which is obtained has the following overall composition (Table 5).

TABLE 5

Overall composition of the finished product

| Dosings | grams | % |
|---|---|---|
| Baked mixture | 15.5 | 44.3 |
| Filling cream | 19 | 54.3 |
| Anhydrous decoration cream | 0.5 | 1.43 |
| Total | 35 | 100 |

The product was then packaged in a filtered and controlled air chamber in metallized barrier film. The shelf life of the thus packaged product at ambient temperature is 6 months.

The product obtained had a humidity of 28% and a water activity value of 0.87 homogeneously distributed. The product had a regular appearance and a uniform colour. The product was also found to be uniformly soft and free of crusts, with a cream filling in the centre. The casing of cake was found to be in one piece, no point of joining between the two mixtures being essentially visible.

The finished product of the invention had a diameter of the flat base of 70 mm and a height of 26 mm.

The product also had the following nutritional profile (Table 6).

TABLE 6

Nutritional profile of the product of Example 1 per 100 g

| | |
|---|---|
| Energy/kcal | 347 |
| Proteins (g) | 6 |

TABLE 6-continued

Nutritional profile of the product of
Example 1 per 100 g

| | |
|---|---|
| Fats (g) | 14 |
| — of which saturated (g) | 6.8 |
| Carbohydrates (g) | 48.2 |
| of which sugars (g) | 31 |
| Fibres (g) | 2.3 |
| Salt (g) | 0.45 |

Figure 1:
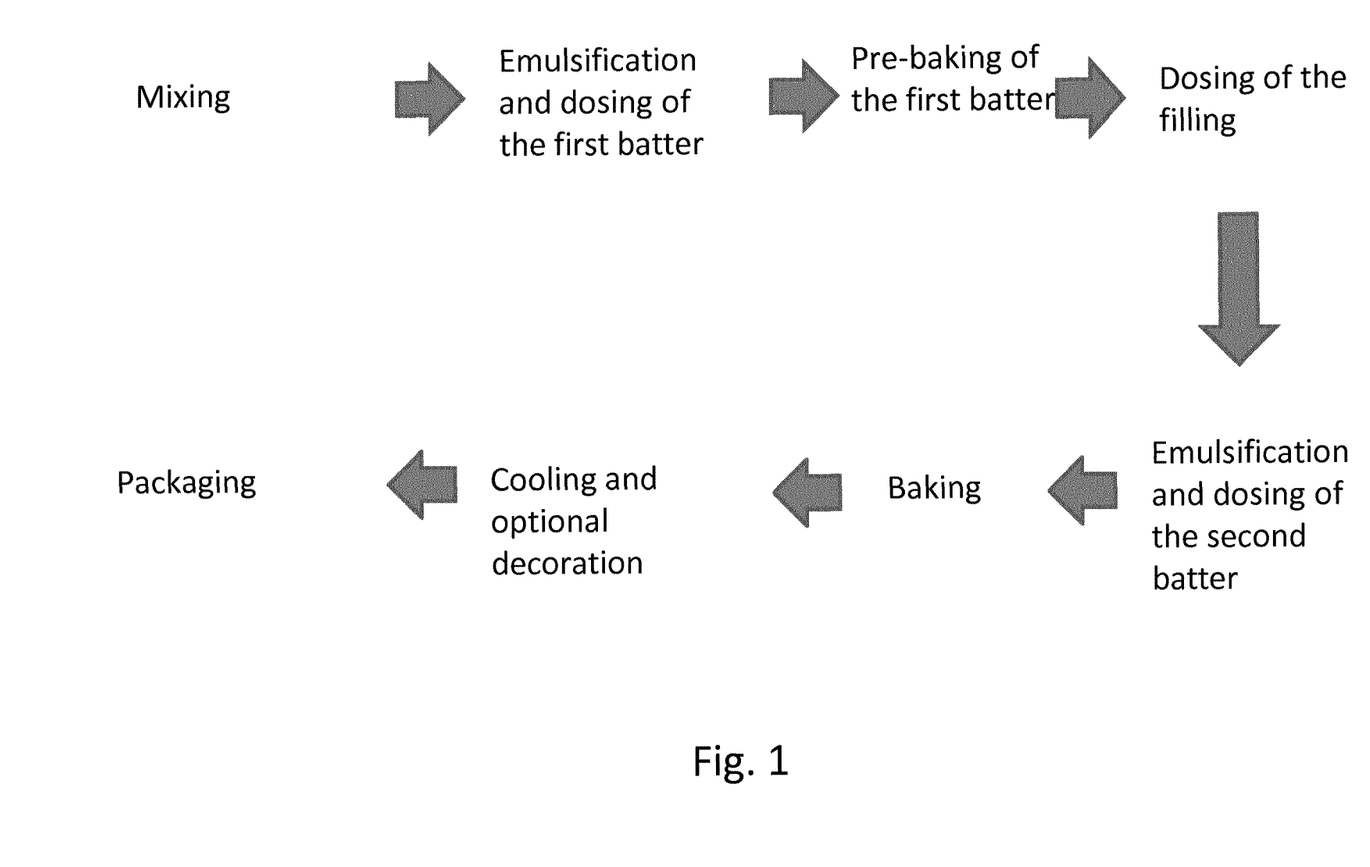
FIG. 1 is a flow diagram that summarises the process of the invention.
Figure 2:
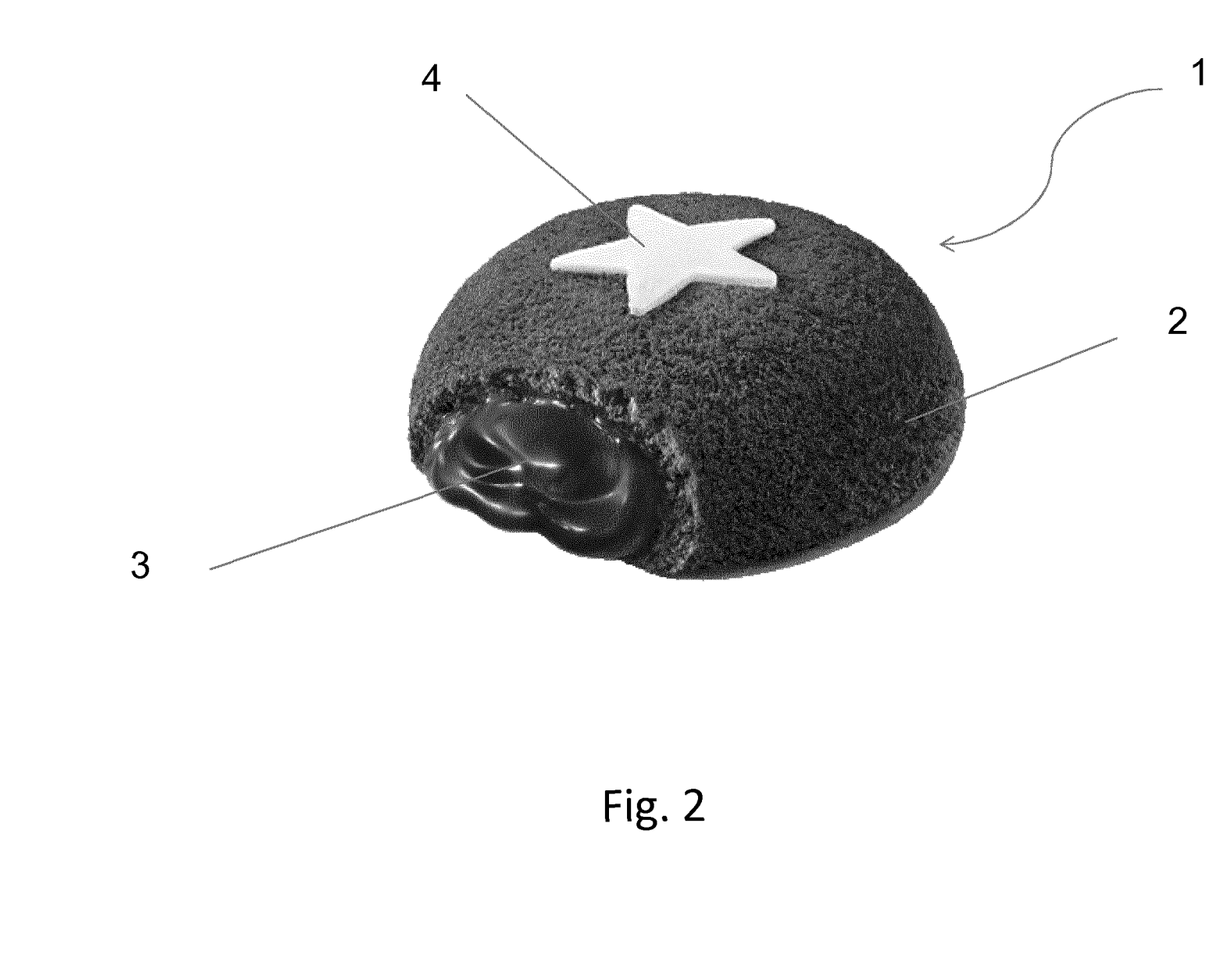
FIG. 2 is a photograph of a product obtained according to the process of the invention.

Referring to FIG. 2, a product 1 is shown according to the invention which can be obtained according to the process as just described, wherein reference numeral 2 corresponds to the casing resulting from the joining of the first batter (upper) with the second batter (base), reference numeral 3 corresponds to the filling enclosed inside the casing, in this case a cocoa-flavoured cream, and reference numeral 4 corresponds to the anhydrous decoration.

The invention claimed is:

1. A process for the production of packaged shelf-stable sponge-type bakery product having a casing of chemically leavened cake and filling inside said casing, which comprises the steps of:
    a) preparation of a first batter comprising sugar, flour, animal and/or vegetable fats and/or oils, at least one leavening agent, starch, egg products, optionally water and optionally at least one ingredient characterizing the taste and the appearance of the packaged shelf-stable bakery product;
    b) emulsification and dosing of said first batter on a baking surface, wherein said emulsification is carried out by passing the first batter in a turboemulsifier and with the incorporation of between 26% and 30% air by volume of the first batter;
    c) steam baking of said first batter dosed on the flat baking surface to form a layer of semi-baked mixture;
    d) placing the semi-baked mixture in a baking mould of semispherical shape which gives to said layer of semi-baked mixture a concave shape;
    e) dosing of a filling inside said layer of the semi-baked mixture obtained in step d), thus obtaining an open and filled semi-finished product;
    f) preparation of a second batter comprising sugar, flour, animal and/or vegetable fats and/or oils, at least one leavening agent, starch, egg products, optionally water and optionally at least one ingredient characterizing the taste and the appearance of the packaged shelf-stable bakery product;
    g) emulsification and dosing of said second batter obtained in step f) on said open and filled semi-finished product of step e), thus obtaining a covered and filled semi-finished product, wherein said emulsification is carried out by passing the second batter in a turboemulsifier and with the incorporation of between 35% and 40% air by volume of the second batter;
    h) steam baking of said covered semi-finished product obtain in step g) to form the bakery product that comprises the casing of the chemically leavened cake and filling inside the casing, wherein the cake casing has a humidity content of between 20% and 30%;
    i) cooling of said baked and filled bakery product; and
    j) packaging of said baked and filled bakery product.

2. The process according to claim 1 wherein in step a) of preparation of the first batter and in step e) of preparation of the second batter, said first and second batter comprise, by weight based on the total weight of each respective batter, 23-28% sugar, 10-15% flour, 8-13% animal and/or vegetable fats and/or oils, 0.3-0.8% of at least one leavening agent, 10-15% starch, 20-30% egg products, 0-5% water and 0-8% of said at least one ingredient characterizing the taste and the appearance of the finished bakery product.

3. The process according to claim 1, wherein the at least one ingredient characterizing the taste and the appearance of the finished bakery product in the first and second batter is selected from the group consisting of cocoa, chocolate, milk, coffee, nuts, cereal grain particles, malt, fruit and vegetable juices and purees, or mixtures thereof.

4. The process according to claim 3, wherein said at least one ingredient characterizing the taste and the appearance of the finished bakery product is present at 2-6% by weight based on the total weight of the first and second batter respectively.

5. The process according to claim 1, wherein the starch is selected from the group consisting of the group consisting of starch of wheat, rice, potato, corn, tapioca and mixtures thereof, wherein the starch is optionally deglutinated.

6. The process according to claim 1, wherein said flour in the first and second batter is selected the group consisting of from any cereal flour, wholemeal or refined, with or without gluten.

7. The process according to claim 1, wherein the weight ratio between the contents of starch and of flour in the first and second batter is between 0.5 and 3.

8. The process according to claim 1, wherein in steps b) and g) of emulsification and dosing of said respectively first and second batter, the emulsification is carried out by passing the batter in a turboemulsifier, with the incorporation of a percentage of air by volume based on the volume of the first batter is 28% in step b) and 38% in the second batter in step f).

9. The process according to claim 1, wherein said flat baking surface is a grid covered with a sheet of baking paper.

10. The process according to claim 1, wherein step c) of steam baking is carried out in a steam oven with a homogeneous atmosphere of saturated steam at ambient pressure, at a temperature between 90 and 100° C. and for a time between 3 and 7 minutes.

11. The process according to claim 10, wherein at the end of step c) of steam baking, said layer of semi-baked mixture has a humidity between 20% and 30%.

12. The process according to claim 1, wherein said filling is hydrated and is selected from the group the group consisting of a cocoa flavoured cream, jam, honey, fruit puree and combinations thereof.

13. The process according to claim 1, wherein in step e) of dosing of the filling the quantity of filling that is dosed on said layer of semi-baked mixture is such as to constitute at least 40% by weight based on the weight of the finished baked bakery product.

14. The process according to claim 13, wherein said quantity of filling that is dosed on said layer of semi-baked mixture is from 60 to 70% by weight based on the weight of the finished baked bakery product.

15. The process according to claim 1, wherein step h) of baking of said covered semi-finished product is carried out in a steam oven with a homogeneous atmosphere of saturated steam at ambient pressure, at a temperature between 90 and 100° C. and for a time between 8 and 16 minutes.

16. The process according to claim 13, wherein at the end of step h) of baking, the cake casing has a humidity content of about 28%.

17. The process according to claim 1, wherein said first batter of step a), said second batter of step f) and said filling of step e) are gluten free.

18. The process according to claim 1, wherein no artificial preservatives are added.

19. The process according to claim 1, wherein step h) of cooling is followed by a step of surface decoration of said baked bakery product, carried out with dosing of an anhydrous filling.

20. The process according to claim 1, wherein in step j) of packaging, said bakery product is packaged in a metallized barrier film.

21. The process according to claim 6, wherein said cereal flour is selected from the group comprising durum wheat, soft wheat, *turanicum* wheat (*triticum turgidum* ssp. *Turanicum*), rye, corn, rice, spelt, barley, sorghum, millet, oats, triticale, buckwheat, *quinoa*, or mixtures thereof.

* * * * *